(12) United States Patent
Wang

(10) Patent No.: US 8,739,161 B1
(45) Date of Patent: May 27, 2014

(54) PROCESS MANAGEMENT

(75) Inventor: Chuan Wang, Chicago, IL (US)

(73) Assignee: Infoblox Inc., Santa Clara, CA (US)

( * ) Notice: Subject to any disclaimer, the term of this patent is extended or adjusted under 35 U.S.C. 154(b) by 1794 days.

(21) Appl. No.: 11/011,489

(22) Filed: Dec. 13, 2004

(51) Int. Cl.
*G06F 9/46* (2006.01)

(52) U.S. Cl.
USPC .......................................................... 718/100

(58) Field of Classification Search
None
See application file for complete search history.

(56) References Cited

U.S. PATENT DOCUMENTS

| 6,742,181 | B1 * | 5/2004 | Koike et al. | 719/317 |
| 7,623,547 | B2 | 11/2009 | Dooley et al. | |
| 2002/0010798 | A1 * | 1/2002 | Ben-Shaul et al. | 709/247 |
| 2002/0083426 | A1 * | 6/2002 | Sistla | 717/168 |
| 2003/0182625 | A1 * | 9/2003 | Davidov et al. | 715/513 |

* cited by examiner

*Primary Examiner* — Mengyao Zhe
(74) *Attorney, Agent, or Firm* — Van Pelt, Yi & James LLP

(57) ABSTRACT

A technique for managing a plurality of processes is disclosed. The technique includes reading a process manager configuration file and executing a set of actions according to the timing and conditions specified in the process manager configuration file. The process manager configuration file is a markup language-based specification of the timing and conditions of the execution of the processes.

29 Claims, 4 Drawing Sheets

PROCESS MANAGEMENT

FIELD OF THE INVENTION

The present invention relates generally to computer software. More specifically, process management is disclosed.

BACKGROUND OF THE INVENTION

Network services, such as DNS, DHCP, and SNMP, are associated with processes that need to be managed and scheduled. For example, certain processes may be configured to start when the system boots up or restart when related configuration information changes. Typically, the timing and conditions of the execution of the processes are programmed in hard-coded shell scripts written specifically for each service. Such an approach is inflexible to future changes and difficult to scale. It would be desirable to have a more flexible and scalable way to manage processes.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method of managing a plurality of processes is disclosed. A process manager configuration file is read. Sets of actions are executed according to the timing and conditions specified in the process manager configuration file. The process manager configuration file is a markup language-based specification of the timing and conditions of the execution of the processes.

Figure 1:
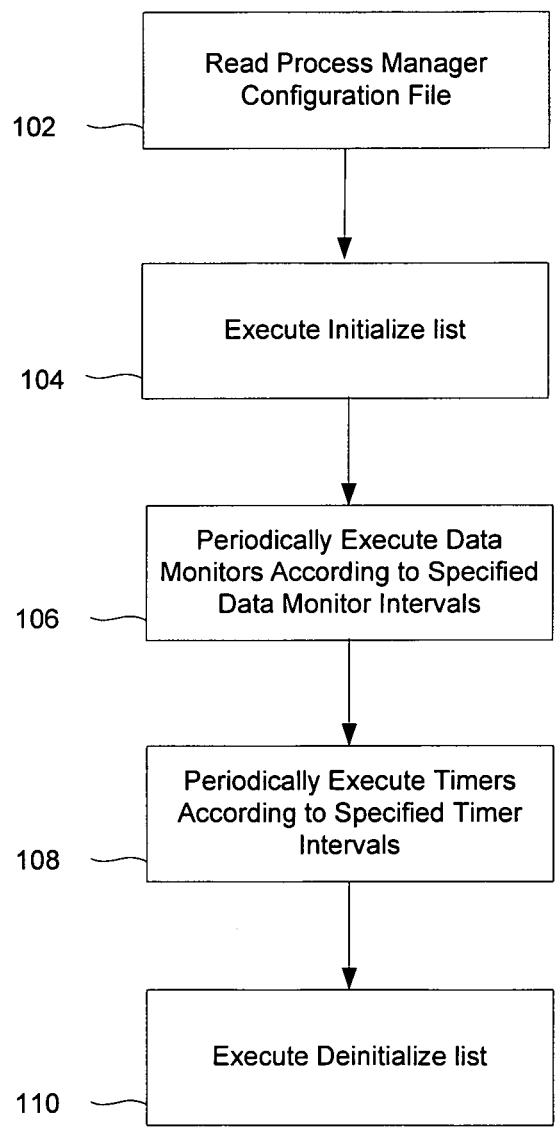
FIG. 1 is a flowchart illustrating a method of managing processes.

FIG. 1 is a flowchart illustrating a method of managing processes. Such processes may run on a computer, an appliance, or any type of processor, for example. The processes may be associated with network services, such as DNS, DHCP, RADIUS, SNMP, or NTP. For example, the processes may run on a special purpose network appliance that provides one or more network services. In some embodiments, a process manager or process manager daemon performs the following process. A process manager configuration is file is read (102). The process manager configuration file includes an initialize list, a deinitialize list, a list of data monitors, and a list of timer monitors. In some embodiments, the process manager configuration file is written in XML or an XML-based language.

The initialize list is executed (104). The initialize list lists actions to be executed at startup. Each action includes one or more commands. Each command may specify a script or other executable to be run. For example, an appropriate action could be specified to cause an APACHE server and its associated processes to automatically start at startup.

Data monitors are executed periodically according to specified data monitor intervals (106). Data monitors are conditionally executed sets of actions. For example, a particular data variable is read periodically from a database. If a condition is met, a set of actions is executed. Multiple conditions may be specified, as more fully described below.

Timers are periodically executed according to specified timer intervals (108). Timers are periodically executed sets of actions. Each time a timer expires, a set of actions is executed.

The deinitialize list is executed (110). The deinitialize list lists actions to be executed at shutdown. For example, an appropriate action could be specified to cause an APACHE server and its associated processes to automatically stop at shut down.

The following is an example of a process manager configuration file:

```
<process_manager>
   <initialize_list>
      LIST OF ACTIONS TO BE EXECUTED AT START
         OF PROCESS MANAGER
   </initialize_list>
   <deinitialize_list>
      LIST OF ACTIONS TO BE EXECUTED AT END OF
         PROCESS MANAGER
   </deinitialize_list>
   <data_monitor_list>
      CONDITIONALLY EXECUTED SETS OF ACTIONS
   </data_monitor_list>
   <timer_monitor_list>
      PERIODICALLY EXECUTED SETS OF ACTIONS
   </timer_monitor_list>
   <action_list>
      DESCRIPTION OF ALL ACTIONS
   </action_list>
</process_manager>
```

The following is an example of an initialize list and a deinitialize list:

```
<!--
   Actions executed at start of process manager
-->
   <initialize_list>
      <execute_action name="start_controld"/>
      <execute_action name="start_lcd"/>
      <execute_action name="start_serial_console"/>
```

```xml
      <execute_action name="start_apache"/>
      <execute_action name="start_monitor"/>
   </initialize_list>
<!--
Actions executed at end of process manager
-->
   <deinitialize_list>
      <execute_action name="stop_monitor"/>
      <execute_action name="stop_apache"/>
      <execute_action name="stop_ntp"/>
      <execute_action name="stop_sshd"/>
      <execute_action name="stop_snmpd"/>
      <execute_action name="stop_controld"/>
      <execute_action name="stop_lcd"/>
      <execute_action name="stop_serial_console"/>
      <execute_action name="stop_named"/>
      <execute_action name="stop_dhcpd"/>
   </deinitialize_list>
```

In one embodiment, these lists are included in a process manager configuration file. The names of the actions to be executed at startup in this example include "start_controld", "start_lcd", "start_serial_console", etc. Each of these action names can be found in an action list, which specifies the commands to be executed for each action. The action list is more fully described below. The names of the actions to be executed at shutdown or when restarting include "stop_monitor", "stop_apache", "stop_ntp", etc. Each of these action names can be found in the action list.

The following is an example of an action list:

```xml
<!--
List of actions
-->
<action_list>
   <!-- snmp actions -->
   <action name="start_snmpd">
      <command name="make_snmpd_conf"
         type="spawn_wait" command_string="/infoblox/
         one/bin/make_snmpd_conf"/>
      <command name="start_snmpd" type="spawn"
         command_string="/usr/sbin/snmpd -c /etc/snmp/
         snmpd.conf -f -P /var/run/snmpd.pid"/>
      <command name="start_one_subagent"
         type="spawn" command_string="/infoblox/one/
         bin/one_subagent"/>
   </action>
   <action name="check_snmpd_conf">
      <command name="check_snmpd_conf"
         type="spawn_wait" command_string="/infoblox/
         one/bin/check_snmpd_conf"/>
   </action>
   <action name="stop_snmpd">
      <command name="stop_one_subagent" type="kill"
         command_string="/infoblox/var/one_subagent-
         .pid one_subagent"/>
      <command name="stop_snmpd" type="kill" command_string="/var/run/snmpd.pid snmpd"/>
   </action>
   <!-- ssh actions -->
   <action name="start_sshd">
      <command name="start_sshd" type="spawn" commandstring="/usr/sbin/sshd"/>
   </action>
   <action name="stop_sshd">
      <command name="stop_sshd" type="kill" command_string="/var/run/sshd.pid sshd"/>
   </action>
   <action name="rotate_syslog">
      <command name="rotate_syslog" type="spawn"
         command_string="/infoblox/one/bin/rotate_syslog"/>
   </action>
   <!-- resolver actions -->
   <action name="make_resolver_conf">
      <command name="make_resolver_conf"
         type="spawn_wait" command_string="/infoblox/
         one/bin/make_nsswitch_conf" />
   </action>
</action_list>
```

In one embodiment, this list is part of a process manager configuration file. Each action can include any number of commands, where each command may specify an executable, such as a shell script or a binary. For example, the first action is "start_snmpd". When "start_snmpd" is executed, three commands are executed: "make_snmpd_conf", "start_snmpd", and "start_one_subagent". Each command includes one or more arguments. For example, the first command, "make_snmpd_conf", has a type argument ("spawn_wait") and a command_string argument ("/infoblox/one/bin/make_snmpd_conf"). In this example, the type argument can have values "spawn", "spawn_wait", and "kill". The type argument "spawn_wait" indicates that the execution of the command should be complete before executing the next command. For example, "make_snmpd_conf" may be a script that generates an SNMP configuration file. "start_snmpd" may be a script that starts the SNMP server. In this case, "make_snmpd_conf" has type "spawn_wait" because the next command, "start_snmpd", cannot start until the SNMP configuration file is generated. The type argument "spawn" indicates that the execution of the command does not need to be complete before executing the next command. The type argument "kill" is used when terminating a process. In this example, the command_string argument indicates the path where the command to be executed is located.

The following is an example of a timer monitor list:

```xml
<timer_monitor_list>
   <timer_monitor name="rotate_syslog" interval="30">
      <execute_action name="rotate_syslog"/>
   </timer_monitor>
</timer_monitor_list>
```

In one embodiment, this list is included in a process manager configuration file. The timer monitor list includes one timer monitor in this example, "rotate_syslog". The "rotate_syslog" monitor is executed every 30 seconds, as indicated by the interval value. The interval may be specified in seconds or in any other unit. The "rotate_syslog" monitor specifies the "rotate_syslog" action. In the case of the action list shown above, the "rotate_syslog" action specifies a "rotate_syslog" command that specifies a script or other executable that rotates the system log file when the size of the system log file exceeds a threshold.

Figure 2:
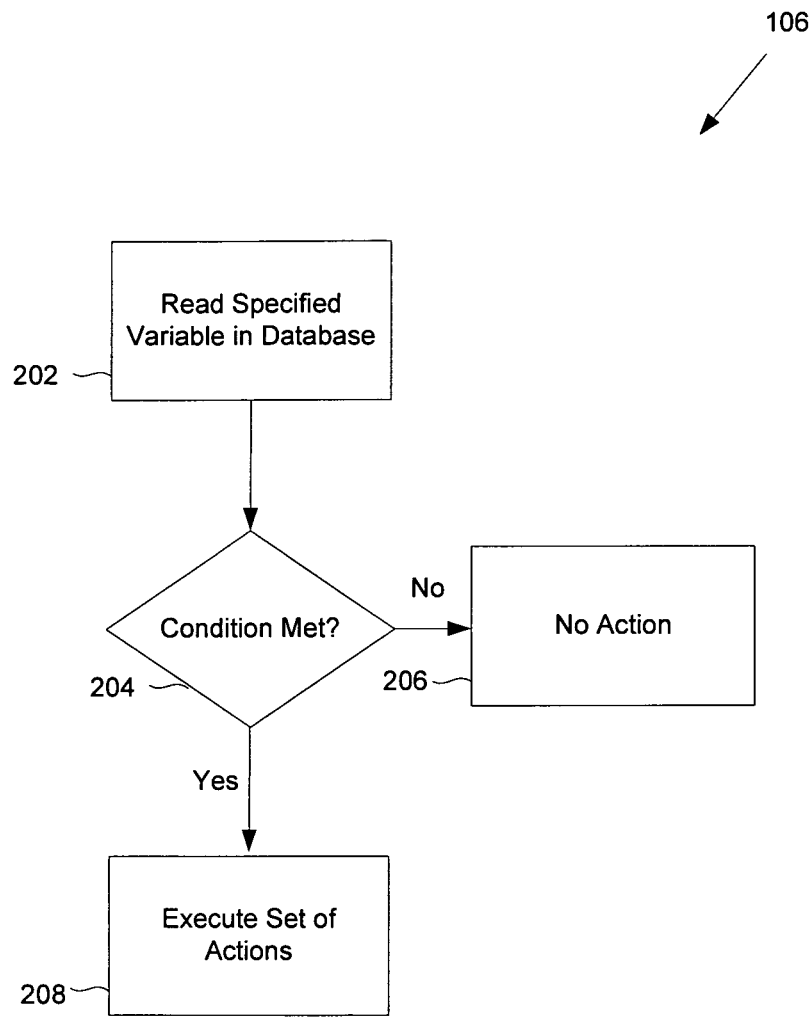
FIG. 2 is a flowchart illustrating a method of executing a data monitor.

FIG. 2 is a flowchart illustrating a method of executing a data monitor. In some embodiments, this process is used in step 106 of FIG. 1. This process repeats periodically according to a specified interval. The period (interval) may be specified in seconds or in any other unit. A specified variable in the database is read (202). For example, a database query of the variable is made. It is determined whether a condition is met (204). For example, the condition may be considered met if the specified variable has a certain value. If the condition is not met, no action is taken (206). If the condition is met, a set of actions is executed (208). More than one condition may be specified, as more fully described below.

The following is an example of a data monitor list:

```
<!--
conditionally executed sets of actions
-->
<data_monitor_list>
    <!-- snmp data monitor -->
    <data_monitor name="snmp_monitor">
        <target query="service_status_snmp_enabled" interval="10"/>
        <!-- condition list -->
        <condition type="boolean" value="true" changed="true">
            <execute_action name="start_snmpd"/>
        </condition>
        <condition type="boolean" value="true" changed="false">
            <execute_action name="check_snmpd_conf"/>
        </condition>
        <condition type="boolean" value="false" changed="true">
            <execute_action name="stop_snmpd"/>
        </condition>
    </data monitor>
    <!-- sshd data monitor -->
    <data_monitor name="sshd_monitor">
        <target query="service_status_support_access_enabled" interval="10"/>
        <!-- condition list -->
        <condition type="boolean" value="true" changed="true">
            <execute_action name="start_sshd"/>
        </condition>
        <condition type="boolean" value="false" changed="true">
            <execute_action name="stop_sshd"/>
        </condition>
    </data monitor>
    <!-- resolver data monitor -->
    <data_monitor name="resolver_monitor">
        <target query="service_status_resolver_enabled" interval="10"/>
        <!-- condition list -->
        <condition type="boolean" value="true" changed="true">
            <execute_action name="make_resolver_conf"/>
        </condition>
        <condition type="boolean" value="true" changed="false">
            <execute_action name="make_resolver_conf"/>
        </condition>
        <condition type="boolean" value="false" changed="true">
            <execute_action name="make_resolver_conf"/>
        </condition>
    </data_monitor>
</data_monitor_list>
```

In one embodiment, this list is included in a process manager configuration file. In this example, the first data monitor is "snmp_monitor", which monitors an SNMP process (or processes). The target query value indicates the variable to be queried and the interval indicates the period between each query, i.e., the database variable "service_status_snmp_enabled" is queried every 10 second interval. Based on the specified conditions, an action may be executed. In this example, three conditions are shown, depending on the value of "service_status_snmp_enabled" (value) and on whether that value has changed compared to its previous value (changed). For example, if value is "true" and changed is "true", the action "start_snmpd" is executed. The action "start_snmpd" can be found in the action list described above. This example is discussed more fully below.

The data monitor list also includes a "resolver_monitor" to monitor a resolver process. The "resolver_monitor" queries the database for the value of "service_status_resolver_enabled" every 10 seconds. Three conditions are specified. If value is "true" and changed is "true", value is "true" and changed is "false", or value is "false" and changed is "true", the action "make_resolver_conf" is executed. In this example, executing the action "make_resolver_conf" generates a resolver configuration file. The condition in which value is "false" and changed is "false" is not specified. This would be the case if the resolver process is not running and the value of "service_status_resolver_enabled" was not changed to "true" during the last 10 seconds. In this case, no action is executed. However, in all other cases, the action "make_resolver_conf" is executed. In other words, the resolver configuration file is regenerated every 10 seconds as long as the resolver process is running.

Figure 3:
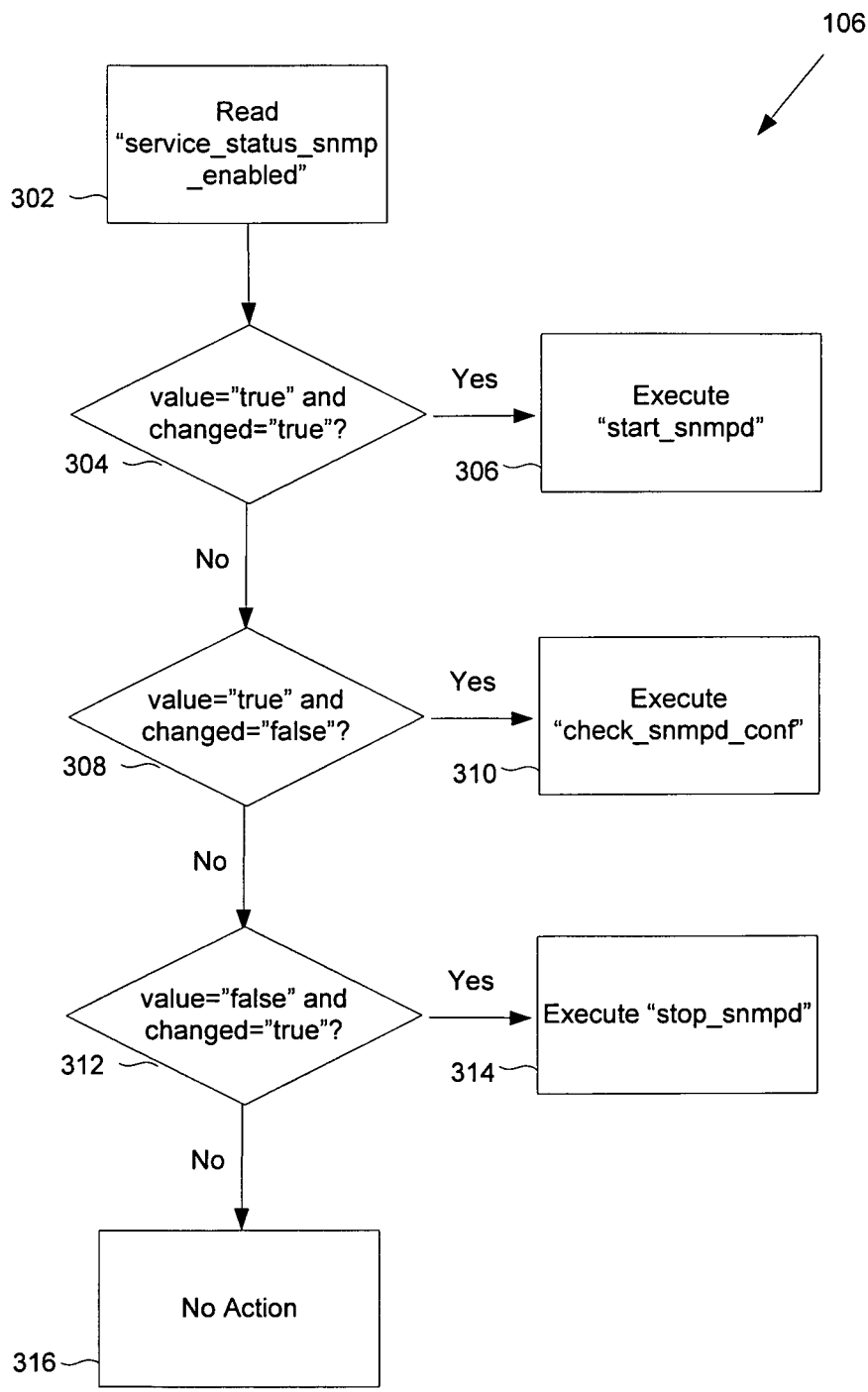
FIG. 3 is a flowchart illustrating a method of executing an example of a data monitor.

FIG. 3 is a flowchart illustrating a method of executing the data monitor "snmp_monitor" described above. "snmp_monitor" has an interval of 10, so this process repeats every 10 seconds. The "service_status_snmp_enabled" variable is read from the database (302). In one embodiment, "service_status_snmp_enabled" indicates whether the SNMP service is enabled. Accordingly, a value of "true" or "false" is returned. It is determined whether the value of "service_status_snmp_enabled" (value is "true") and the value is changed from the last value (changed is "true") (304). If value is "true" and changed is "true", the action "start_snmpd" is executed (306). This would be the case if SNMP is not running and the value of "service_status_snmp_enabled" was changed from "false" to "true" during the last interval. The system would detect this and start SNMP using the "start_snmpd" action.

Otherwise, it is determined whether value is "true" and changed is "false" (308). If value is "true" and changed is "false", the action "check_snmpd_conf" is executed (310). This would be the case if SNMP is running and the value of "service_status_snmp_enabled" was not changed during the last interval. The system would then execute the action "check_snmpd_conf", as more fully described below.

Otherwise, it is determined whether value is "false" and changed is "true" (312). If value is "false" and changed is "true", the action "stop_snmpd" is executed (314). This would be the case if SNMP is running and the value of "service_status_snmp_enabled" was changed from "true" to "false" during the last interval. The system would detect this and stop SNMP using the "stop_snmpd" action. Otherwise, no action is taken (316).

The actions may be specified in an action list, as described above. In some embodiments, the current value is compared with a previous value stored in a cache.

Figure 4:
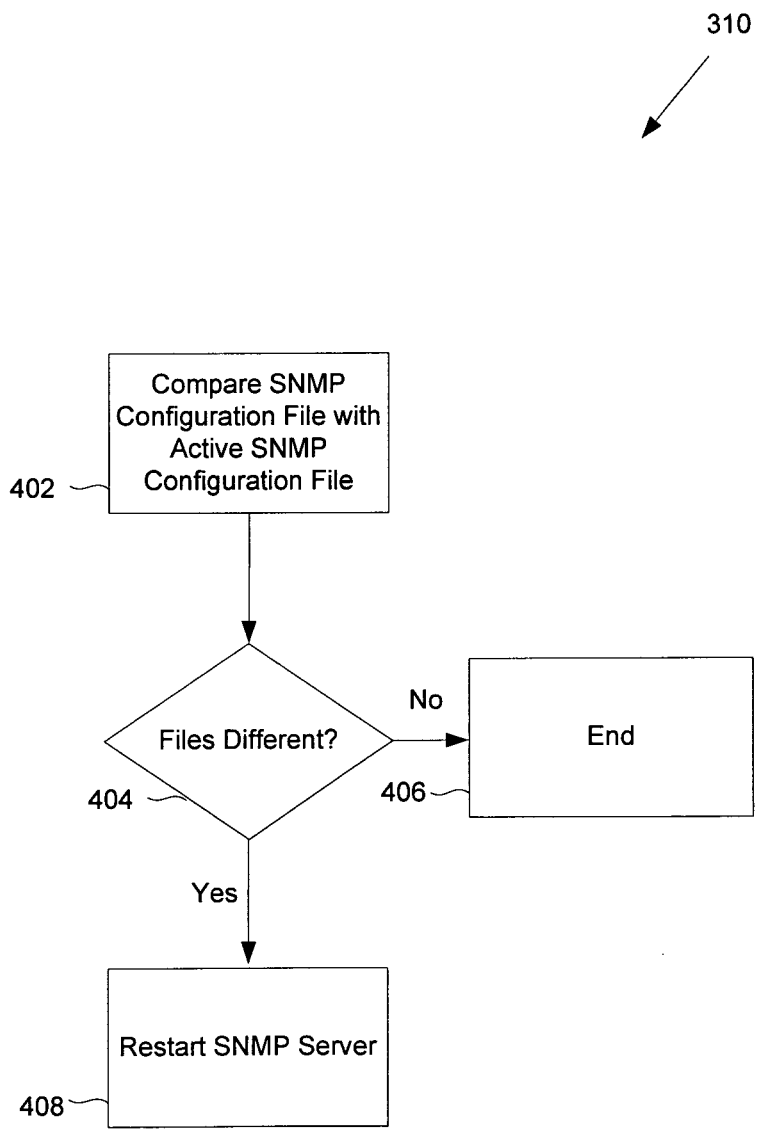
FIG. 4 is a flowchart illustrating a method of executing an example of an action.

FIG. 4 is a flowchart illustrating a method of executing the action "check_snmpd_conf" described above. In some embodiments, this process is used to perform step 310 of FIG. 3. In this example, the SNMP configuration file is compared with the active SNMP configuration file (402). In some embodiments, the SNMP configuration file includes community string, administrator contact information, trap receivers information. When the SNMP server starts, the SNMP configuration file is copied and the copy becomes the active SNMP configuration file. It is determined whether the files are different (404). If the files are not different, the process ends (406). If the files are different, the SNMP server is restarted (408). In other words, if a change is made to the SNMP configuration file, that change is detected and the SNMP server is restarted so that the new configuration becomes active. Similarly, other data monitors, such as a DNS data monitor, may be specified to have similar behavior, i.e., when a change is made to the DNS configuration file, the DNS server is restarted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing a plurality of processes, including:
    reading a process manager configuration file associated with a plurality of network services processes that are being simultaneously managed by a process manager, wherein the network services associated with the plurality of network services processes include two or more of the following: Network Time Protocol (NTP), Secure Shell (SSH), Simple Network Management Protocol (SNMP), Domain Name System (DNS), Dynamic Host Configuration Protocol (DHCP), Remote Authentication Dial In User Service (RADIUS), and Apache;
    using a process manager to execute a set of actions according to the timing and conditions specified in the process manager configuration file;
    wherein the process manager is configured to:
    a) execute a first data monitor action specified in the process manager configuration file as one of the set of actions based at least upon:
    1) a current data value associated with a current state of a network service process, and
    2) a change indication associated with whether a previous state of the network service process has changed with respects to the current state of a network service process; and
    b) execute a second data monitor action specified in the process manager configuration file as one of the set of actions based at least upon:
    1) a configuration value associated with a network service configuration file, and
    2) an active configuration value associated with an active network service configuration file;
    wherein each data monitor action specifies a network services command comprising a shell script or a binary executable associated with the network service process;
    restarting the network service associated with the network service configuration file, in the event that the network service configuration file and the active network service configuration file are different; and
    wherein the process manager configuration file is a markup language-based specification of the timing and conditions of the execution of the network services processes.

2. The method as recited in claim 1, wherein the process manager configuration file is an XML file.

3. The method as recited in claim 1, wherein a process manager performs the reading and the executing of the process manager configuration file.

4. The method as recited in claim 1, wherein one of the actions is executed when a process manager starts.

5. The method as recited in claim 1, wherein one of the actions executes conditionally.

6. The method as recited in claim 1, wherein one of the actions executes periodically.

7. The method as recited in claim 1, wherein one of the actions executes when a process manager ends.

8. The method as recited in claim 1, wherein one of the actions specifies a command.

9. The method as recited in claim 1, wherein one of the actions specifies a command and the command specifies an executable.

10. The method as recited in claim 1, further including executing an executable specified in the process manager configuration file.

11. The method as recited in claim 1, wherein executing includes:
    reading a value of a specified variable; and
    executing an action based on whether the value meets a condition.

12. The method as recited in claim 1, wherein executing includes:
    reading a value of a specified variable; and
    executing an action based on whether the value has changed.

13. A system for managing a plurality of processes, including:
    a processor; and
    a process manager configured to:
    read a process manager configuration file associated with a plurality of network services processes that are being simultaneously managed by a process manager, wherein the network services associated with the plurality of network services processes include two or more of the following: Network Time Protocol (NTP), Secure Shell (SSH), Simple Network Management Protocol (SNMP), Domain Name System (DNS), Dynamic Host Configuration Protocol (DHCP), Remote Authentication Dial In User Service (RADIUS), and Apache;
    execute a set of actions according to the timing and conditions specified in the process manager configuration file;
    wherein the process manager is configured to:
    a) execute a first data monitor action specified in the process manager configuration file as one of the set of actions based at least upon:
    1) a current data value associated with a current state of a network service process, and
    2) a change indication associated with whether a previous state of the network service process has changed with respects to the current state of a network service process; and
    b) execute a second data monitor action specified in the process manager configuration file as one of the set of actions based at least upon:
    1) a configuration value associated with a network service configuration file, and
    2) an active configuration value associated with an active network service configuration file;
    wherein each data monitor action specifies a network services command comprising a shell script or a binary executable associated with the network service process;
    restarting the network service associated with the network service configuration file, in the event that the network service configuration file and the active network service configuration file are different; and
    wherein the process manager configuration file is a markup language based specification of the timing and conditions of the execution of the network services processes.

14. The system as recited in claim 13, wherein the process manager configuration file is an XML file.

15. The system as recited in claim 13, wherein one of the actions is executed when a process manager starts.

16. The system as recited in claim 13, wherein one of the actions executes conditionally.

17. The system as recited in claim 13, wherein one of the actions executes periodically.

18. The system as recited in claim 13, wherein one of the actions executes when a process manager ends.

19. The system as recited in claim 13, wherein one of the actions specifies a command.

20. A computer program product for managing a plurality of processes, the computer program product being embodied in a non-transitory computer readable storage medium and comprising computer instructions for:
   reading a process manager configuration file associated with a plurality of network services processes that are being simultaneously managed by a process manager, wherein the network services associated with the plurality of network services processes include two or more of the following: Network Time Protocol (NTP), Secure Shell (SSH), Simple Network Management Protocol (SNMP), Domain Name System (DNS), Dynamic Host Configuration Protocol (DHCP), Remote Authentication Dial In User Service (RADIUS), and Apache;
   using a process manager to execute a set of actions according to the timing and conditions specified in the process manager configuration file;
   wherein the process manager is configured to:
   a) execute a first data monitor action specified in the process manager configuration file as one of the set of actions based at least upon:
   1) a current data value associated with a current state of a network service process, and
   2) a change indication associated with whether a previous state of the network service process has changed with respects to the current state of a network service process; and
   b) execute a second data monitor action specified in the process manager configuration file as one of the set of actions based at least upon:
   1) a configuration value associated with a network service configuration file, and
   2) an active configuration value associated with an active network service configuration file;
   wherein each data monitor action specifies a network services command comprising a shell script or a binary executable associated with the network service process;
   restarting the network service associated with the network service configuration file, in the event that the network service configuration file and the active network service configuration file are different; and
   wherein the process manager configuration file is a markup language-based specification of the timing and conditions of the execution of the network services processes.

21. The computer program product as recited in claim 20, wherein the process manager configuration file is an XML file.

22. The computer program product as recited in claim 20, wherein one of the actions is executed when a process manager starts.

23. The computer program product as recited in claim 20, wherein one of the actions executes conditionally.

24. The computer program product as recited in claim 20, wherein one of the actions executes periodically.

25. The computer program product as recited in claim 20, wherein one of the actions executes when a process manager ends.

26. The computer program product as recited in claim 20, wherein one of the actions specifies a command.

27. The method as recited in claim 1, wherein two of the network services are SNMP and DNS.

28. The method as recited in claim 1, wherein two of the network services are SNMP and DHCP.

29. The method as recited in claim 1, wherein two of the network services are DHCP and DNS.

* * * * *